(12) United States Patent
Amin et al.

(10) Patent No.: US 11,256,557 B1
(45) Date of Patent: Feb. 22, 2022

(54) EFFICIENT PROCESSING OF RULE-BASED COMPUTING WORKFLOWS

(71) Applicant: Coforge Business Process Solutions Private Limited, Pune (IN)

(72) Inventors: Gopal Amin, Karnataka (IN); Naveenkumar V. Kallahalli, Karnataka (IN)

(73) Assignee: Coforge Business Process Solutions Private Limited

( * ) Notice: Subject to any disclaimer, the term of this patent is extended or adjusted under 35 U.S.C. 154(b) by 0 days.

(21) Appl. No.: 17/203,734

(22) Filed: Mar. 16, 2021

(51) Int. Cl.
  *G06F 9/54* (2006.01)
  *G06F 16/2455* (2019.01)

(52) U.S. Cl.
  CPC .......... *G06F 9/547* (2013.01); *G06F 16/2455* (2019.01)

(58) Field of Classification Search
  None
  See application file for complete search history.

(56) References Cited

U.S. PATENT DOCUMENTS

| | | | | |
|---|---|---|---|---|
| 6,868,413 B1* | 3/2005 | Grind | .................... | G06Q 10/10 706/59 |
| 7,398,237 B2 | 7/2008 | Agostini et al. | | |
| 8,229,946 B1* | 7/2012 | Crane | .................... | G06F 9/505 707/764 |
| 9,213,698 B1 | 12/2015 | Tsypliaev et al. | | |
| 10,331,948 B1* | 6/2019 | Flament | ................. | G06N 5/025 |
| 10,678,522 B1 | 6/2020 | Yerramreddy et al. | | |
| 2004/0167840 A1 | 8/2004 | Tully et al. | | |
| 2005/0187967 A1* | 8/2005 | Couch | .................... | G06Q 30/02 |
| 2009/0055907 A1 | 2/2009 | Hom | | |
| 2009/0171903 A1 | 7/2009 | Lin et al. | | |
| 2010/0004954 A1* | 1/2010 | Pelenur | ................. | G06Q 50/16 705/4 |
| 2011/0082845 A1 | 4/2011 | Padala et al. | | |

(Continued)

OTHER PUBLICATIONS

Bizzylabs.tech [online], "What you need to know", published on or before Mar. 15, 2021, retrieved on Mar. 24, 2021, retrieved from URL<https://bizzylabs.tech/>, 11 pages.

(Continued)

*Primary Examiner* — Chat C Do
*Assistant Examiner* — William C Wood
(74) *Attorney, Agent, or Firm* — Fish & Richardson P.C.

(57) ABSTRACT

Methods, systems, and apparatus, including computer programs encoded on computer-storage media, for efficiently processing of rule-based computing workflows. In some implementations, a system includes a database, a web server module to provide resources for a rule management user interface having interactive controls to create and edit rules, and an application server module providing services to carry out functions specified through an application programming interface (API). The application server module is configured to (i) receive a request to apply a set of rules to a set of records, and (ii) perform, in response to receiving the request, a set of operations that includes: obtaining the set of rules from the database. The system dynamically translates the rules into executable or interpretable code configured to apply the rules, and invokes the executable or interpretable code to apply the rules to the records in the set of records.

19 Claims, 11 Drawing Sheets

(56) References Cited

U.S. PATENT DOCUMENTS

| | | | |
|---|---|---|---|
| 2011/0125827 A1 | 5/2011 | Ramanathan et al. | |
| 2011/0208670 A1 | 8/2011 | Joseph et al. | |
| 2012/0304249 A1 | 11/2012 | Luo et al. | |
| 2015/0262127 A1* | 9/2015 | Ziegler | G06F 16/955 705/342 |
| 2016/0217196 A1* | 7/2016 | Banister | G06F 16/284 |
| 2019/0251072 A1* | 8/2019 | Pyle | G06F 16/2365 |
| 2020/0177634 A1* | 6/2020 | Hwang | H04L 63/1433 |

OTHER PUBLICATIONS fr.com [online], "Automate enterprise-wide business process testing, and use business intelligence to improve efficiency with Copasys", available on or before Nov. 23, 2020, via internet archive: Wayback Machine URL<https://web.archive.org/web/20201123183745/https://www.slkglobalsolution.com/copasys/>, 8 pages.

fr.com [online], "Consistently improve loan quality and process efficiency across the mortgage lifecycle with Mortgage QC", available on or before Dec. 22, 2020, via internet archive: Wayback Machine URL<https://web.archive.org/web/20201222194819/https://www.slkglobalsolution.com/mortgage-qc/>, 8 pages.

fr.com [online], "Enhance precision and efficiency in tax servicing with our technology-enabled property tax services platform RETS", available on or before Nov. 23, 2020, via internet archive: Wayback Machine URL<https://web.archive.org/web/20201123183330/https://www.slkglobalsolution.com/rets/>, 8 pages.

fr.com [online], "Improve processes and governance while lowering cost with our Mortgage Lending Services", available on or before Dec. 22, 2020, via internet archive: Wayback Machine URL<https://web.archive.org/web/20201222195105/https://www.slkglobalsolution.com/mortgage/>, 8 pages.

Freecodecamp.org [online], "Just In Time Compilation Explained", published on Jan. 31, 2020, retrieved on Mar. 24, 2021, retrieved from URL<https://www.freecodecamp.org/news/just-in-time-compilation-explained/>, 6 pages.

Slkglobalsolution.com [online], "100% Adherence to Regulation X in Mortgage Loss Mitigation", published Jun. 2020, retrieved on Mar. 24, 2021, retrieved from URL<https://www.slkglobalsolution.com/wp-content/uploads/2020/06/100-Adherence-to-Regulation-X-in-Mortgage-Loss-Mitigation-1.pdf>, 1 page.

Slkglobalsolution.com [online], "Achieve a more streamlined, effective, and efficient quality control environment with COPASYS", published Feb. 2021, retrieved on Mar. 24, 2021, retrieved from URL<https://www.slkglobalsolution.com/wp-content/uploads/2021/02/C-Copasys-web-brochure-Feb. 2, 2021.pdf>, 8 pages.

Slkglobalsolution.com [online], "Achieve an efficient and effective QC environment with Copasys, our automated QC platform driving quality CoE", published on Feb. 20, 2021, retrieved on Mar. 24, 2021, retrieved from URL<https://www.slkglobalsolution.com/copasys/>, 8 pages.

Slkglobalsolution.com [online], "Business Case: Compliance Audit and QC in Payment Processing with RegTech Platform Copasys", published May 2020, retrieved on Mar. 24, 2021, retrieved from URL<https://www.slkglobalsolution.com/wp-content/uploads/2020/05/Payment-Processing-3.pdf>, 1 page.

Slkglobalsolution.com [online], "Testing 100% of Hazard Insurance Changes 15× Faster with 100% Accuracy", published Oct. 2020, retrieved on Mar. 24, 2021, retrieved from URL<https://www.slkglobalsolution.com/wp-content/uploads/2020/10/Testing-100-of-hazard-insurance-changes-15x-faster-with-100-accuracy.pdf>, 1 page.

Stackoverflow.com [online], "How to implement a rule engine?", published in Jun. 2011, retrieved on Mar. 24, 2021, retrieved from URL<https://stackoverflow.com/questions/6488034/how-to-implement-a-rule-engine>, 15 pages.

Viglas, "Just-In-Time Compilation for SQL Query Processing", 30th International Conference on Data Engineering, 2014, pp. 1298-1301.

Wikipedia.org [online], "Just-In-Time Compilation", published on or before Mar. 15, 2021, retrieved on Mar. 24, 2021, retrieved from URL<https://en.wikipedia.org/wiki/Just-in-time_compilation>, 7 pages.

* cited by examiner

EFFICIENT PROCESSING OF RULE-BASED COMPUTING WORKFLOWS

BACKGROUND

The present specification relates to databases and data processing, including efficient processing of rule-based computing workflows.

Many modern tasks include processing large data sets to characterize the data and evaluate the content. These tasks can often involve the application of complex sets of rules which can be time-consuming even for powerful computer systems.

SUMMARY

In some implementations, a system provides a versatile and efficient platform for creating and applying customized sets of rules to records. The system can provide the versatility to create and refine complex sets of rules that apply to different situations. Different users and organizations can build and use different sets of rules and apply them to different data sets that are imported or otherwise entered into the system. For example, the system can provide user interfaces and data interfaces to generate and import sets of rules. The system can also import data sets and selectively apply the appropriate sets of rules to process the records. For example, the system can be used to validate records, detect errors or anomalies, ensure compliance with standards, identify suspicious data entry, and so on.

The system uses an architecture that enhances the speed and efficiency of applying complex rule sets to large data sets. One way that the system does this is to dynamically translate a set of rules into code that can be invoked (e.g., executed, interpreted, etc.) to process records with very high performance. The rules are maintained in a database in a standardized or canonical form that is not invocable code, for example, as text, conditional expressions, entries in a table or database, and so on. For example, the rules can be stored in a manner that allows the rules to be presented in a human-readable manner, enables review and editing, and preserves rich metadata about the rules (e.g., sources of the rules, relationships among the rules, objectives of the rules, versioning of the rules, complex security and access permissions for rule access and rule changes, etc.). When the system receives a request to apply a set of rules to a data set, the system generates invocable code representing the specific set of rules to be applied. The invocable code runs much faster and more efficiently than generalized software functions that would read and interpret rules from their canonical form. For example, the invocable code represents an optimized version of the rules, with high-level criteria in the rules being implemented with low-level functions for data retrieval, data comparison, and other actions. The system then invokes the generated code to apply the rule set to each of the individual records to be processed.

The dynamic code generation performed by the system allows significant optimization, for performance far better than standard techniques for applying rules. The code generation step allows the system to interpret the rule set once at the beginning of processing a batch of records, including considering as a whole the full set of rules that will be processed for each record. As the set of rules to be applied may vary from one request to the next, dynamic generation of code for each request can facilitate each request being processed using an optimizations among the specific set of rules being applied for that request. The code generation can optimize the processing to, for example, re-use calculation results where applicable (e.g., among rules in the set of rules), to avoid duplicate calculations, to remove calculations that do not impact the criteria or objective of the processing, to reorder the rules to a more computationally order, to express conditional statements in computationally efficient format, and so on. The optimizations made during the code generation provide improved efficiency for each of the different records to be processed. As a result, when the data set to be processed includes hundreds or thousands of records, the efficiency gains of a single optimization are multiplied hundreds or thousands of times over the processing of the record set. Although dynamically generating the rules this incurs some initial processing overhead for handling a request, the efficiency gains achieved for many records can be much higher than this overhead.

Generating the code for rules "just-in-time" in response to requests to apply rules ensures that the current versions of the rules are used each time. The system can provide a multi-user, multi-tenant system that enables different remote users to update and change a shared set of rules (e.g., for a task, organization, account, etc.). When a user initiates application of rules to a data set, the system temporarily blocks further changes to the involved rules for the duration of the processing. The system retrieves the current, most up-to-date rules from the database and generates the code from them, ensuring that each request to apply rules uses an optimized version of the correct, current set of rules. After the request is fulfilled, the system unblocks the associated rules and allows further changes to be made. The code that was generated for the previous request can be discarded, and new optimized code can be generated for the next request based on the rules specified by that request.

To facilitate the translation into code, the system can check and validate rules as they are entered and saved. The system can also store the rules in a format that specifies the relationships and dependencies among the rules, making the optimization and code generation process more efficient. The system can store data structures (e.g., tables, indexes, etc.) that designate computer instruction(s) for different types of rules and different rule elements. For example, the system can store mapping data that indicates, for each of different rules or rule elements, the instructions that will implement the rule or portion of the rule efficiently. The system can have a library of efficient code snippets mapped to rule types or rule elements. The system can efficiently build the optimized code version for a rule set by retrieving the code snippets that correspond to rules in a set of rules to be applied, and then combining the code snippets by inserting values and variables into appropriate fields determined from the rules. The system may process the combined snippets into an invocable format, e.g., executable code, an intermediate representation (e.g., intermediate between source code and executable code), interpretable code, object code, bytecode, machine code, microcode, etc.

Another advantageous feature of the system is the ability to use the generated code in multiple software processes or threads that run concurrently to process different subsets of the overall set of records to be processed. The number of processes can be dynamically determined based on various factors, such as the number of records in the data set, thresholds or preferences, constraints on execution of the data processing, and so on. For example, the system can have a maximum limit for a number of records to be handled by a single analysis process or thread (e.g., a single executing software process or software thread). The system can determine how many different processes or threads are needed to analyze the records in a set and still fit within the maximum limit on records per process or thread. The system then divides the data set into subsets, starts the determined number of software processes or threads, and evaluates the subsets in parallel using the different processes or threads. Each of the different software processes or threads can run the generated code that provides an optimized application of the rules.

In some implementations, a system includes a database, a web server module to provide resources for a rule management user interface having interactive controls to create and edit rules, and an application server module providing services to carry out functions specified through an application programming interface (API). The application server module is configured to (i) receive a request to apply a set of rules to a set of records, and (ii) perform, in response to receiving the request, a set of operations that includes: obtaining the set of rules from the database; dynamically translating the rules into executable or interpretable code configured to apply the rules; and invoking the executable or interpretable code to apply the rules to the records in the set of records, including initiating multiple parallel software processes or threads that each invoke the executable or interpretable code to separately and concurrently process different subsets of the set of records, wherein the amount of software processes or threads is determined based on the characteristics of the set of records.

Implementations can include one or more of the following features. For example, in some implementations, the application server module is configured to delete or discard the optimized versions after processing the records in the set of records.

In some implementations, the web server module is configured to provide the user interface to remote devices of each of multiple organizations or accounts, and to store separate sets of data processing rules for the respective organizations or accounts in the database.

In some implementations, the request is associated with a particular organization or account. The application server module is configured to obtain the set of records from among data processing records maintained in the database in association with the particular organization or account.

In some implementations, the request corresponds to a particular subset of the data processing rules defined for the particular user or account, and obtaining the set of data processing rules comprises: generating a database request specifying the particular subset; and executing the database request to retrieve the particular subset of the data processing rules.

In some implementations, the application server module is configured to: determine a count of records in the set of records; determine, based on the count of records, a number of software processes or threads to initiate to apply the set of data processing rules to the records; divide the set of records into the determined number of different subsets; initiate the particular number software processes or threads, with each of the software processes or threads being assigned to process a different one of the subsets of the set of records, the software processes or threads running concurrently to independently invoke the executable or interpretable code for their respective subsets.

In some implementations, determining the number of software processes or threads comprises: determining a maximum number of records per software process or thread; and determining the number of software processes or threads such that each of the records can be assigned to a software process or thread and each software process or thread is assigned no more than the maximum number of records from the set of records.

In some implementations, the data processing rules indicate criteria for evaluating the records. The one or more services includes an audit manager service, wherein the audit manager service is configured to invoke the executable or interpretable code in the optimized versions to apply the set of data processing rules to the set of records. The audit manager service is configured to store results of invoking the executable or interpretable code that specifies results of the data processing rules, the results indicating, for each of the records in the set of records, whether the record satisfies the respective criteria.

In some implementations, the criteria specify at least one of a threshold for a value in a record, a range for a value in a record, a content element for a record, or a processing step required to be indicated for a record.

In some implementations, the application server module and the web server module both run on a single server system.

In some implementations, the web server module is configure to provide the user interface as part of a web application hosted by the web server module, the web application being configured to manage requests for application of rules to data sets in a non-blocking manner to enable users to navigate between different pages of the web application while the rule application is performed in the background.

In some implementations, the data processing rules in the set of data processing rules include rules that provide conditional branching to apply different criteria and rule elements depending on the content and context of the records.

In some implementations, the user interface includes interactive controls for a user to (i) define rule elements that each include a condition to be evaluated based on the values of one or more data fields of a record, and (ii) relationships among the rule elements.

In some implementations, the user interface is configured to provide, in the user interface, a preview area the indicates results of applying, to a sample record, rules currently as currently edited in the user interface.

In some implementations, the user interface provides a control for a user to select the sample record from among one or more data sets associated with the user, or wherein the system automatically selects the sample record from among one or more data sets associated with the user.

In some implementations, the application server provides a rule manager service and an audit manager service, wherein the rule manager service receives input through from the web service module to create and update data processing rules in the database, and wherein the audit manager service is restricted to read-only access to the data processing rules in the database.

In some implementations, the optimized versions of the set of rules include one or more in-memory dynamic link libraries (DLLs).

In some implementations, the application server module generates and invokes the code in the optimized versions such that the application server module generates and saves, for each record, result data indicating each condition of the set of rules that is determined, through invocation of the code, to not be satisfied. The web server module is configured to access the result data for a record and provide resources for a user interface that identifies (i) a classification determined for the record based on the application of the data processing rules and (ii) and output specifying conditions of the rules that were determined to not be satisfied.

Other embodiments of these aspects and other aspects discussed herein include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIGS. 6 to 10 illustrate user interfaces for a rule creation process of the rule manager module.

Like reference numbers and designations in the various drawings indicate like elements.

DETAILED DESCRIPTION

Figure 1:
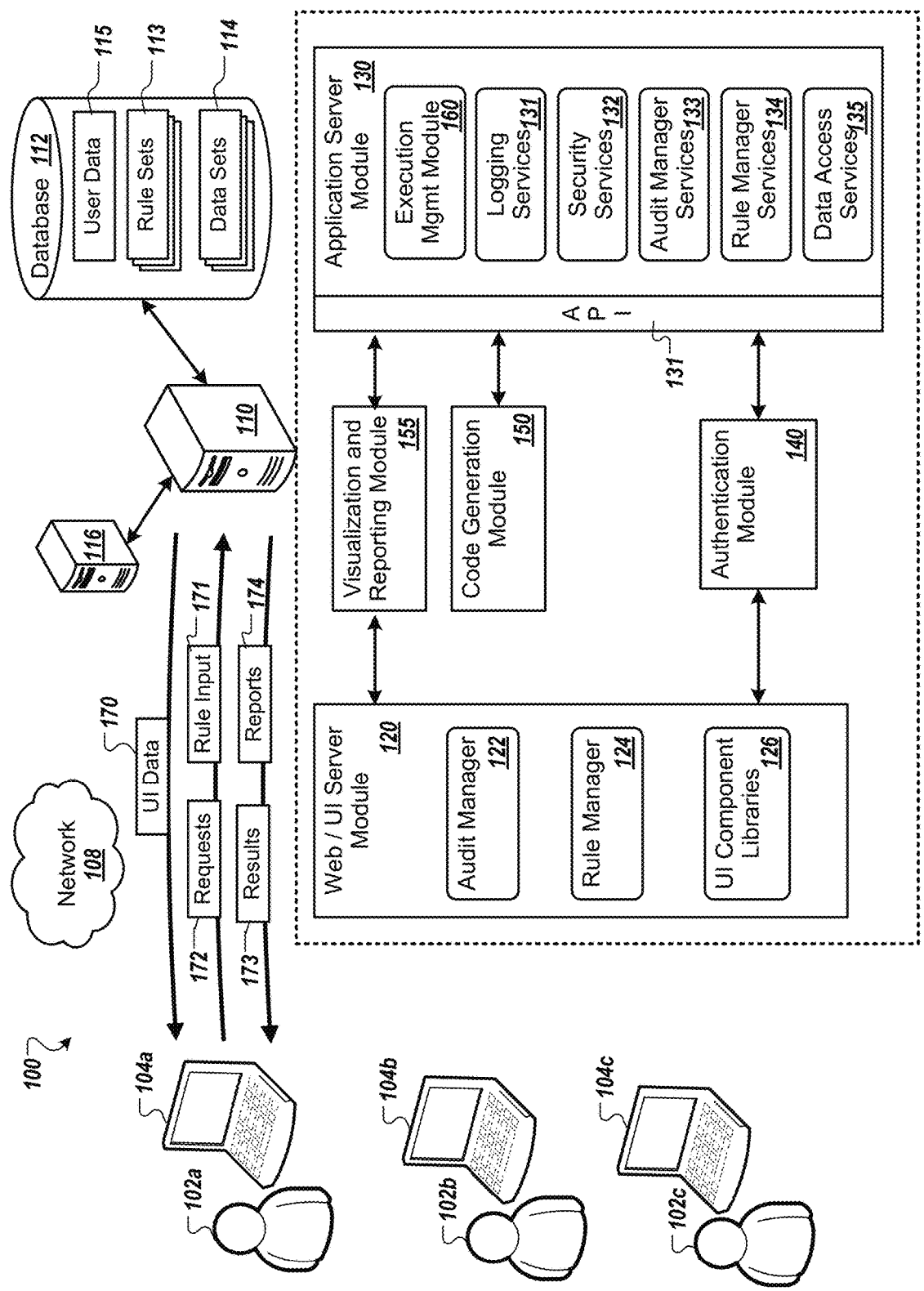
FIG. 1 is a diagram showing an example of a system for efficient processing of rule-based computing workflows.

FIG. 1 is a diagram showing an example of a system 100 for efficient processing of rule-based computing workflows. The system 100 includes a server system 110 that provides a multi-user, multi-tenant platform for customized generation of rules and application of the rules to data sets. The server system 110 includes a web or UI server module 120 ("web server module 120") that provides resources of user interfaces for (1) a rule manager user interface for viewing, entering, and editing rules, and (2) an audit manager user interface for initiating the application of rules to data sets. The server system 110 also includes an application server module 130 that provides services to carry out tasks based on inputs through the user interfaces provided by the web server module 120.

In more detail, the server system 110 allows different users or organizations to define and use customized sets of rules for evaluating data sets. The custom rule sets can be stored for each user, organization or account. For example, different client organizations may have accounts with the server system 110 and one or more sets of rules defined for each organization. Individual organizations may have multiple users with different roles and thus different permissions for accessing and changing the rules of the organization.

The example of FIG. 1 shows three client devices 104a-104c that each can communicate with the server system 110 over a communication network 108. The client devices 104a-104c have respective users 102a-102c which may be from the same organization or account or may be from different organizations or accounts. The network 108 may include wired and/or wireless networks, and may include one or more public networks, such as the Internet, private networks, and other communication infrastructure. Although each of the client devices 104a-104c can separately and concurrently access the rule manager user interface and rule manager user interface, the example shows in more detail some example interactions with a single client device 104a.

For example, the server system 110, using the web server module 120, provides user interface (UI) data 170 to the client device 104a. The UI data 170 can be provided as resources (e.g., HTML files, media files, script files, CSS files, etc.) of a web page or web-based application, as content to be displayed in a native application, or in another format. The web server module 120 can store a UI component library 126 with which the web server module 120 selects components to build the UI data 170 that, when rendered by the client device 104a, provides the desired user interface.

Users can be required to authenticate to the system to gain access. Once a user's credentials are verified, the user can be provided access that is limited to the rules and data sets of the user's organization, and may be further limited by the role of the user. The server system 110 can store user data 115 in a database 112 that indicates authorized users, credential reference data to verify authorization, organizations of the users, roles of the users in their organizations, permissions or restrictions for the users, and so on. An authentication module 140 of the server system 110 can process credentials of the users and limit access to the level permitted for each user.

As the user 102a interacts with the user interfaces provided, the user 102a can provide rule input 171 to specify rules to be applied. The rules may be specified for a particular scope, such as a task, context, situation, organization, account, etc. As discussed further below, the user interface for the rule manager can provide interactive controls for a user to enter different conditions or expressions to be evaluated, so that different data fields in records and different characteristics of records can be evaluated with the criteria that a user defines. For example, the rule input 171 may specify fields to be checked, reference values for comparison to the values in the fields (e.g., range boundaries, thresholds, etc.), conditions to evaluate (e.g., whether a value is greater than, less than, or equal to a reference; whether a value is in a particular range; whether a value is defined or not; a size of a records or field; etc.), and results to be provided (e.g., alerts, events, actions, classifications, etc.) for different outcomes of the evaluations. In some cases, records or portions of records can be classified using the sets of rules into classifications such as pass, fail, incomplete, suspect quality or accuracy, etc.

The system 110 uses an architecture that enhances the speed and efficiency of applying complex rule sets to large data sets. One way that the system 110 does this is to dynamically translate a set of rules into code that can be invoked (e.g., executed, interpreted, etc.) to process records with very high performance. The rules are maintained in a database in a standardized or canonical form that is not invocable code, for example, as text, conditional expressions, entries in a table or database, and so on. For example, the rules can be stored in a manner that allows the rules to be presented in a human-readable manner, enables review and editing, and preserves rich metadata about the rules (e.g., sources of the rules, relationships among the rules, objectives of the rules, versioning of the rules, complex security and access permissions for rule access and rule changes, etc.). When the system 110 receives a request to apply a set of rules to a data set, the system 110 generates invocable code representing the specific set of rules to be applied. The invocable code runs much faster and more efficiently than generalized software functions that would read and interpret rules from their canonical form. For example, the invocable code represents an optimized version of the rules, with high-level criteria in the rules being implemented with low-level functions for data retrieval, data comparison, and other actions. The system 110 then invokes the generated code to apply the rule set to each of the individual records to be processed.

The dynamic code generation performed by the system 110 allows significant optimization, for performance far better than standard techniques for applying rules. The code generation step allows the system 110 to interpret the rule set once at the beginning of processing a batch of records, including considering as a whole the full set of rules that will be processed for each record. As the set of rules to be applied may vary from one request to the next, dynamic generation of code for each request can facilitate each request being processed using an optimizations among the specific set of rules being applied for that request. The code generation can optimize the processing to, for example, re-use calculation results where applicable (e.g., among rules in the set of rules), to avoid duplicate calculations, to remove calculations that do not impact the criteria or objective of the processing, to reorder the rules to a more computationally order, to express conditional statements in computationally efficient format, and so on. The optimizations made during the code generation provide improved efficiency for each of the different records to be processed. As a result, when the data set to be processed includes hundreds or thousands of records, the efficiency gains of a single optimization are multiplied hundreds or thousands of times over the processing of the record set. Although dynamically generating the rules this incurs some initial processing overhead for handling a request, the efficiency gains achieved for many records can be much higher than this overhead.

Generating the code for rules "just-in-time" in response to requests to apply rules ensures that the current versions of the rules are used each time. The system 110 can provide a multi-user, multi-tenant system 110 that enables different remote users to update and change a shared set of rules (e.g., for a task, organization, account, etc.). When a user initiates application of rules to a data set, the system 110 temporarily blocks further changes to the involved rules for the duration of the processing. The system 110 retrieves the current, most up-to-date rules from the database and generates the code from them, ensuring that each request to apply rules uses an optimized version of the correct, current set of rules. After the request is fulfilled, the system 110 unblocks the associated rules and allows further changes to be made. The code that was generated for the previous request can be discarded, and new optimized code can be generated for the next request based on the rules specified by that request.

To facilitate the translation into code, the system 110 can check and validate rules as they are entered and saved. The system 110 can also store the rules in a format that specifies the relationships and dependencies among the rules, making the optimization and code generation process more efficient. The system 110 can store data structures (e.g., tables, indexes, etc.) that designate computer instruction(s) for different types of rules and different rule elements. For example, the system 110 can store mapping data that indicates, for each of different rules or rule elements, the instructions that will implement the rule or portion of the rule efficiently. The system 110 can have a library of efficient code snippets mapped to rule types or rule elements. The system 110 can efficiently build the optimized code version for a rule set by retrieving the code snippets that correspond to rules in a set of rules to be applied, and then combining the code snippets by inserting values and variables into appropriate fields determined from the rules. The system 110 may process the combined snippets into an invocable format, e.g., executable code, an intermediate representation (e.g., intermediate between source code and executable code), interpretable code, object code, bytecode, machine code, microcode, etc.

From the rule input 171, the server system 110 creates and stores rules in the database 112 in a rule set 113 for the user 102a or the user's organization. The rules can be varied and complex. Some rules may be context-dependent, such as to apply in certain contexts or for certain data sets. Rule sets 113 can include multiple related rules, such as rules that have a number of sub-rules, e.g., additional components or expressions that are each evaluated and which may related to each other. A rule set 113 can include logic to branch or skip among the rules in the rule set 113.

In some implementations, at least some of the rules in a rule set are automatically defined by the server system 110 or another system. For example, a third-party server system 116 can provide a set of rule input, for example, as a web page or other document or data specifying standards, criteria, or compliance requirements. The server system 110 can derive rules from the third-party source and present the rules for confirmation and editing by the user 102a.

As the user 102a enters and edits rules, the resulting rules are shown on the rule manager user interface. The user interface can also display a preview of application of the rules. For example, the user interface can include a pane or display area that shows how the rules would classify a particular record from a data set of the user 102a, and as the rules are changed the resulting output in the pane can be changed as well.

Once the rules for the rules set 113 have been defined, the user 102a can use the user interface for the audit manager 122 to apply some or all of the defined rules to a set of records. For example, the server system 110 can import a data set 114 from files at the client device 104a, from an Internet source, or from another source and store the data set 114 in the database 112. With interactive controls in the audit manager user interface, the user 102a can initiate a request to apply the rule set 113 to the data set 114. The audit manager user interface can allow the user to select subsets of a data set 114 (e.g., specific records, or records filtered to meet certain criteria) to be processed, as well as to select subsets of a rule set 113 (e.g., specific selected rules, or rules in a certain group, category, or characteristics).

In the example, the user 104a interacts with a UI control to apply a rule set 113 to a data set 114. This results in a data processing request 172 provided by the client device 104a, which is processed by the web server module 130 and then forwarded or otherwise communicated to the application server module 130, verifying of course that the user 102a is authenticated and has the appropriate permissions to make the request. The application server module 130 provides access to various data processing functions through an application programming interface (API) with which the application server module 130 communicates with the web server module 120 and potentially other systems.

The application server module 130 receives the request 172 to apply the set of rules 113 to the data set 114 and then uses a code generation module 150 to generate an optimized, invocable version of the rule set 113. The application server module 130 identifies the rules to be used, requests the rules from the database 112, and provides the rules to the code generation module 150. The code generation module 150 translates the rules from their standardized format into functions and computer instructions that will apply the rules in the rule set 113. The generated code may be in any appropriate form, e.g., source code, object code, byte code, executable code, etc. In some cases, the generated code can be further compiled or otherwise processed to place it in an executable or interpretable form so it can be applied efficiently for various records.

The application server module 130 can manage various software processes for carrying out the application of the rule set 113 according to the request 172. An execution management module 160 can examine the data set 114 and determine a number of processes or threads to initiate or to utilize for carrying out the processing. For example, the execution management module 160 can determine that three different processes or threads should be run in parallel to fulfill the request 172. In response, the module 130 can divide the data set 114 into three subsets of data, and the execution management module 160 can then start three new software processes or threads, each of which will use the generated code to process a different one of the generated subsets.

Once the processing is complete, the application server module 130 stores the results in the database 112 or other data storage. The application server module 130 provides the results to the web server module 120, which then provides the results 173 as data for presentation in a user interface of the client device 104a. The system 110 can also generate and provide reports 174 based on the results of processing various records.

The system 110 can be used in many different areas. One is the world of security assessment, including on server farms, where servers are hardened with respect to policies set in an organization. These servers are first hardened and then cleared for production. However, over time, restrictions are removed and modified, in turn raising the risk. To harden the security of the server, often a verification script is written. The output of the verification script can be compared with respect to the rules using the system 110. Other areas include data analytics where the system 110 can be used to apply data processing rules to clean up data for processing. another area is in human resources, security, and access control, where the system 110 can perform compliance checks regarding access to floors/rooms, time of taken, document availability, approvals, etc. The system 110 has the capability to raise events in many domains. In the security and access control domain, if a unauthorized person gets access to a server room without the required authorization, but using the normal process, the system can raise an event by sending a message or taking other actions. In security assessment, if servers are not re-secured with in a stipulated period of time again an event can be raised. As another example, business data analytics, if the trend of sale is falling for a stipulated period of time the system can raise an event and perform predetermined notification and other actions.

Figure 2:
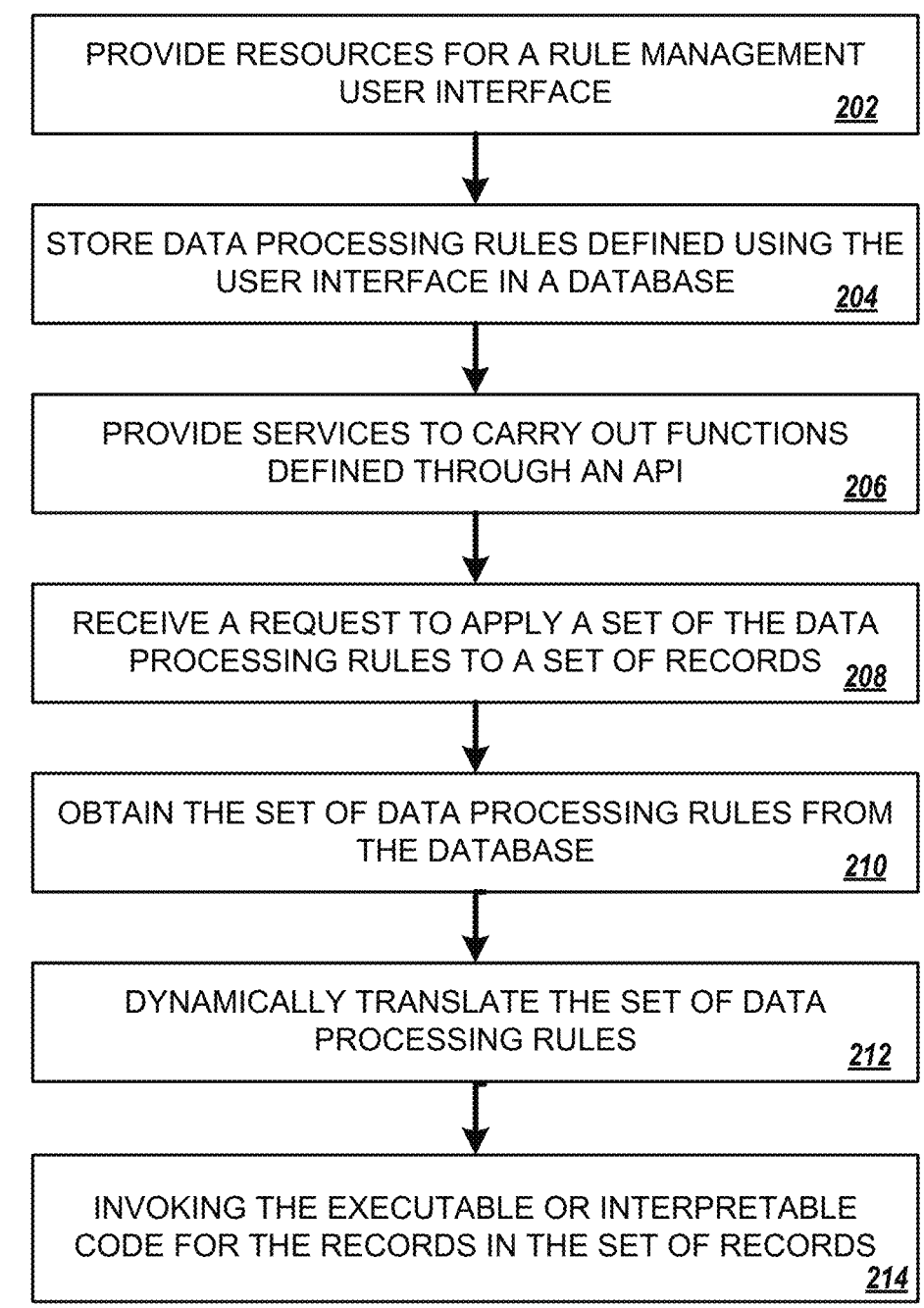
FIG. 2 is flow diagram illustrating an example of a process for efficient processing of rule-based computing workflows.

FIG. 2 is flow diagram illustrating an example of a process 200 for efficient processing of rule-based computing workflows.

The process 200 includes providing resources for a rule management user interface having interactive controls to create and edit data processing rules (202). The user interface can include features that enable a user to specify expressions and conditions for rules, such as through entry of natural language or through selection from options (e.g., from drop-down lists or other controls). The system 110 can provide data to populate various different controls or regions of the user interface, from which a user can select data elements, operators, reference values, and other elements to compose and edit rules. The system 110 is versatile enough to allow entry and processing of rules for many different uses, such as checking engineering designs for safety and compatibility, checking access control records or transaction records to detect anomalies, evaluating mortgage origination and insurance processes for compliance with government regulations, and many more. In general, the system 110 can be used to evaluate or audit any type of records, e.g., technical records, business records, government records, transaction records, etc.

The sets of data elements used can vary for each application and for each different user or organization that uses the system 110. As part of providing the user interface, the system 110 can identify the data elements to use in populating the options. Different data elements can be used for different applications of the system 110. The data elements can be from various different sources. For example, the system 110 can access a database table or other data of a user and identify the types of data elements available (e.g., different columns represented in the database representing different types of data). The system 110 may also import a list of data elements or data types, extract data elements from XML documents or other file types, or receive user-entered data elements. The data elements can be any type of information that the rules will use, such as dates, times, identifiers, names, addresses, and so on. The rules can be configured to apply various operators or comparisons to the data elements that a user selects in order to determine whether desired conditions of the rules are satisfied.

The interface enables a user to enter or select one or more data elements and enter or select from predetermined sets of operators, e.g., selecting from operators such as equals "=," less than "<," greater than ">," less than or equal to "<=," greater than or equal to ">=," not equal to "!=," and so on. Other operators can apply more complex operations, such as determining whether a value is in a range, whether a value is included in a set, determining a distance or difference between values, determining an aggregation (e.g., an average, such as a mean or median, or a minimum or maximum among multiple values), determining whether a geographical location is within a geographical area, determining that a value is defined (e.g., not blank or null), and so on.

The interface enables a user to select or define an operator to apply to a data element, as well as to select or enter a reference for comparison. For example, the reference may be a fixed value (e.g., 5 or 80%) or may be derived from the value of another data element. For example, a user may enter that data element DATE1 is less than or equal to data element DATE2, where DATE1 and DATE2 are different dates in the type of data set the rule is applied to. In applying the rules to a specific record, the specific values of the data elements for that record (e.g., 2/3/20 for the DATE1 field and 2/5/20 for the DATE2 field) are used and compared. The interface can also include fields enabling a user to specify the desired result of the operation for the rule to be satisfied, e.g., whether a particular rule should be true or false for a successful result.

Many implementations of the system 110 provide the rule management interface in a manner that allows the data element selections, operator selections, and reference selections to be made individually, allowing the user to build a rule one element or field at a time. Other options can be used, including natural language entry in which the system 110 extracts from a natural language statement the elements of a rule. The system 110 can provide text entry fields for a user to type or paste in natural language statements, and the system 110 can match elements of the natural language to known corresponding expressions or operators. The system 110 can store a lookup table or other data structure that maps different words and phrases to corresponding data types, data fields, or operators. After the system 110 uses the data to generate a rule expression based on the natural language, the system 110 can indicate the resulting rule on the user interface for a user to verify. The system 110 can also apply the rule to a set of example data (entered or selected by the user or determined by the system 110) and show the result to the user to verify that the rule has the effect desired.

In some implementations, the system 110 is configured to analyze text of natural language text-based documents and extract rules. For example, the system 110 can have a lexicon that maps key terms (which can be single words or multiple-word phrases) to data elements, operators, references, and desired results. The lexicon or rules used by the system 110 can also include semantic data that indicates words and sentence structures that indicate relationships among key terms, e.g., due to word order, prepositions, etc.. The system 110 can identify matches to the key terms and determine the relationships among the terms, and use these to generate sets of rules to apply. The system 110 can also use mappings between key terms and user data sets (e.g., an association of key terms to corresponding column names in a database table) to link the key terms identified in documents to the correct data elements or fields in user data sets. With this functionality, the system 110 enables the user to provide a file, link to an Internet resource, or otherwise specify text and the system 110 can extract a set of rules from it. In this manner, a user may provide a natural language document of standards (e.g., a set of engineering design rules, government rules, accounting standards, financial regulations, statements of corporate best practices, and so on) and the system 110 can use the lexicon for the appropriate subject matter domain to generate a set of rules from the document.

The process 200 includes storing a set of data processing rules defined using the user interface in a database (204). The process 200 includes providing one or more services to carry out functions specified through an application programming interface (API) (206). This can include providing audit services to apply sets of rules to different data sets. The process 200 includes receiving, by the server system 110 and through the API, a request to apply a set of data processing rules to a set of records (208). This request may be provided by a user by selecting a data set and clicking a control that signals that the records in the data set should be processed. Requests can also be provided through an API without a user interface or through other means.

In response to receiving the request, the server system 110 can perform various additional tasks. The process 200 includes obtaining the set of data processing rules from the database (210). The process 200 includes dynamically translating the set of data processing rules obtained from the database into optimized versions that express the set of data processing rules in executable or interpretable code configured to apply the data processing rules (212). The process 200 includes invoking the executable or interpretable code in the optimized versions to apply the set of data processing rules to the records in the set of records (214). Invoking the code can include initiating multiple parallel software processes or threads that each invoke the executable or interpretable code to separately and concurrently process different subsets of the set of records.

The system 110 can determine the amount of software processes or threads based on the characteristics of the set of records. For example, the system 110 can store a predetermined maximum number of records per thread (or a target number or target range of records per thread), and can use the number of records in the set and the predetermined maximum to determine the number of threads to use. The system 110 can apply other constraints, such as using at least a minimum number of threads (e.g., minimum of 2, 4, 10, or some other number), using no more than a maximum number of threads (e.g., no more than 100, 20, 10, etc.), and so on.

Figure 3:
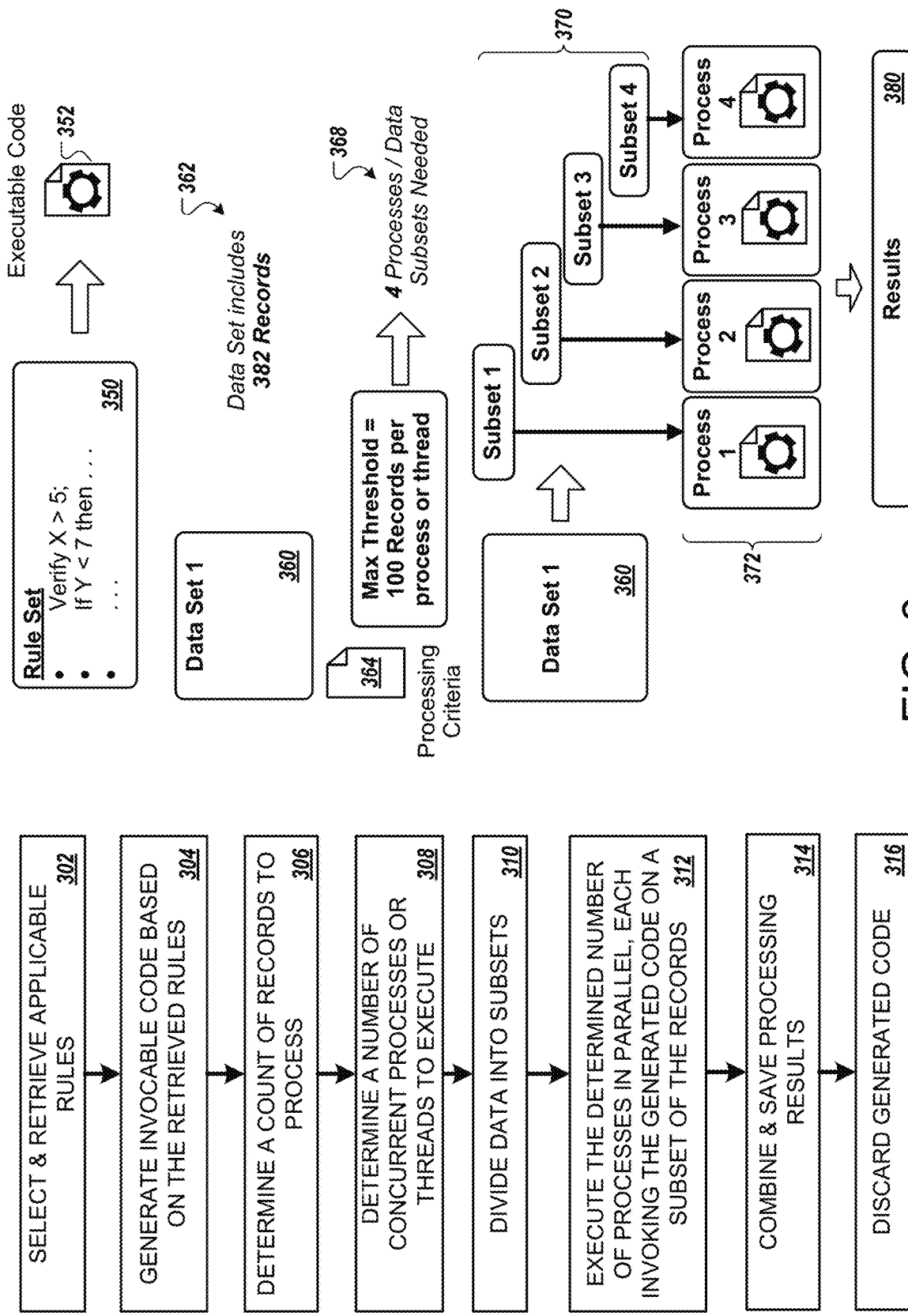
FIG. 3 is a diagram illustrating a flow chart and example series of operations for efficient processing of rule-based computing workflows.

FIG. 3 is a diagram illustrating a flow chart for a process 300 and example series of operations for efficient processing of rule-based computing workflows. The process 300 shows an example of more detailed steps that a computer system 110 may carry out to perform steps 210-214 in FIG. 2. These operations can be performed dynamically, in response to receiving a request for rule processing by the audit manager 122. In some implementations, the compilation of rules is done each time a new processing request is received, performed just-in-time, ensuring that the most up-to-date set of rules is compiled and used in the analysis. Then, the compiled rules are discarded (e.g., deleted or invalidated) so that they are not used again for another processing request, but that the new processing requests each have their own sets of rules compiled.

The process 300 includes selecting and retrieving the set of rules that are applicable to a request to perform data processing (302). The system 110 stores rule sets 113 in the database 112 as shown in FIG. 1. The system 110 can enforce rules that restrict the ability of the audit manager 122 to modify the rules or access the master copies in the database. The rule manager 124 and its related services can be granted permissions to create and edit rules, but the audit manager 122 and its related services may be blocked from editing the rules. The audit manager 122 can thus be limited to read-only access or to receiving a copy of the rule sets 113 so that the audit manager 112 cannot change any of the rules. In the example, the system 110 has identified a rule set 350 from among the various rule sets 113.

The system 110 can also employ techniques to ensure validity of the rules and avoid conflicts among the operations of the audit manager 122 and the rule manager 124. For example, when a request is made for the audit manager 122 to apply a set of rules to a data set, the system 110 can temporarily block any changes to the rules through the rule manager 124 for the duration of the processing of the current request. The system 110 can be used concurrently by many different users within an organization, and there may be users adding or editing rules for a certain type of analysis at the same time that the set of rules is being applied. If an analysis task (such as analyzing a batch of 100,000 records) is being performed and takes 5 minutes for the audit manager 122 to complete, the system 110 locks out changes to the rule set before beginning the analysis task and then unlocks the ability to change the rule set once the analysis task has completed.

The process 300 includes generating invocable code based on the retrieved rules (304). For example, the system 110 can identify each of the rules that need to be applied and compile the appropriate information into executable or interpretable instructions. In some implementations, this involves compiling the rules into a dynamic-link library (DLL) or other shared library or executable object. The result of the generation of an executable shared library by the code generation module 150 is shown as element 352. In some implementations, different rules are compiled as functions that can be called or otherwise invoked, rule by rule. In other implementations, the code that is generated can include the logic and relationships among rules, including conditional branches, context-dependent execution condition, and other selective processing relationships. As a result, invoking one or more functions in the generated code can process a series or sequence of multiple rules, including using a dynamically selected subset that is selected as needed for the content of a record being processed.

The process 300 includes determining a count of records to be processed, e.g., a number of records in a data set 360 associated with the request (306). In general, the system 110 may perform various types of analysis on the data set 360 to be processed to determine the characteristics of the data set 360. The system 110 can also evaluate the nature of the rules 350 to be applied, including the computational complexity of the rules and number of rules to be applied. The system 110 can use this information to estimate the computational complexity and/or amount of time the processing of the rules 350 on the data set 360 is likely to require.

One major factor is the number of records to be processed, e.g., the volume of data and/or the number of different instances of using the rule set needed. In many instances, a record may be represented as a row of data in a database table, so that the number of rows in the database table or a spreadsheet indicates the number of records. Records are not limited to this format however. A record to be processed is more generally one collection of data, within the overall data set, that is independently assessed with the rule set. In some cases, a single "record" may be a data set of another type, such as a set of documents or data items related to a particular user, transaction, entity, or other item. Thus, regardless of the format of the data set (e.g., structured, unstructured, in a single file or database or spread across multiple files or databases), a record can be a portion of the data set 360 resulting in an instance of application of the rule set 350, where different records represent different sub-data sets or transactions that each need to be assessed independently. In the example, the system determines that there are 382 different records in the data set 360, as shown by element 362.

The process 300 includes determining a number of concurrent processes or threads to execute (308). With the information that indicates characteristics of the data set 360 (e.g., the number and type of data records) and the rule set 350 (e.g., the number and type of rules to be applied), the system 110 can determine the level of computational resources needed to process the rule set in an efficient manner and with an acceptable time frame. In some cases, the system has a set of processing criteria 364 that indicate predetermined parameters for the execution of analysis tasks. This can include thresholds, default parameter values, and other elements that specify how tasks should be executed. For example, the system may indicate a maximum threshold 366 for the number of records to be processed in each software process or thread. In the example, this is set at a maximum of 100 records per process or thread. As a result, the system 110 would determine that a data set with 100 or fewer records should be analyzed using a single analysis process or thread; a data set with 101 to 200 records should be analyzed using two analysis processes or threads; and so on. In the example, the system determines 368 that four processes or threads should be used. This is determined to keep the execution time limited and to perform the task efficiently.

Other processing criteria can be used to determine how many processes or threads to run for the requested task. For example, the system 110 can use different processing parameters for handling request with different priority levels or different characteristics. A high-priority request may be fulfilled using a profile that sets a different set of parameters (e.g., maximum 50 records per process) than a low-priority request (e.g., maximum 200 records per process).

The process 300 includes dividing the data set into subset, such as smaller batches, each of which will be evaluated using a different software process or thread (310). Because four processes or threads were determined to be used, the system 110 divides the data set 360 into four different subsets 370 or batches of data, indicated as Subset 1 through Subset 4. The different subsets 370 are typically distinct and non-overlapping, so that each record to be processed is only processed once.

The process 300 includes executing the determined number of processes or threads in parallel, each process or thread 372 invoking the generated code 352 on its assigned subset of the records (312). The processes or threads 372 can each concurrently and asynchronously process the rules in the rule set 350 by executing the corresponding rule elements from the generated code 352, with each worker process or thread 372 saving its results for each record. Each process or thread 372 can use its own copy of the generated code 352. The results for a processed record can include the result overall (e.g., whether the record passed the overall set of tests) and/or the results for each rule applied (e.g., an indication of each rule passed or failed). The results can indicate the specific rules or sub-rules that did not pass, allowing the system 110 to indicate which rule or portion of a rule was not compliant and the reasons why the rule was not complied with.

The process 300 includes combining and saving the results of the processing (314). The stored results from each of the different processes or threads 372 are combined into a final result data set 380 that includes the results for each of the records in the set of records 360. This data is saved in a database, such as the database 112. The system 110 can then provide reports, visualizations, alerts, and other outputs based on the results 380. This can include providing, in a message or as user interface data to display, data that identifies records that did not comply with one or more rules in the rule set, as well as which values or conditions lead to the non-compliance. The results can also trigger other actions and workflows by the system 110. For example, the system 110 can take records that did not comply with the rules and can assign these rules to task queues for the organization or for specific individuals. These records can then be surfaced by the system 110 as alerts or items for review, presented to the individuals having the responsibility for the types of actions needed or for the records involved.

The process 300 includes discarding the generated code 352 after the current use is complete (316). The system 110 can discard, e.g., delete, the generated code 352 after the processing of the data set 360 is complete. For each request handled by the audit manager, e.g., each batch of records or each data set 360 to be processed, the system 110 can re-compile a new set of executable code with the most current set of rules available.

To facilitate review of the rules as well as the efficient generation of invokable code, the rules sets 113 stored in the database 112 can be stored in a standardized or canonical form that can be mapped by the system 110 both to (1) natural language display for readability for users and ease of editing by users and (2) programming elements that can be compiled. For example, the format in which rule sets 113 are stored can be one in which rule elements (e.g., data elements, operators or conditions, references, and desired results or criteria for evaluation) can be mapped to text descriptions as well as to source code elements (e.g., source code blocks, expressions, functions, subroutines, etc.). The system 110 can store translation data that maps different stored elements to corresponding natural language and programming expressions. The translation data can include mappings used in general, e.g., across different client organizations, users, and data sets or rule sets, and may include more specialized mappings for specific organizations, users, and data sets or rule sets. For example, individual rule sets 113 may each have corresponding metadata that specifies how the data elements referenced in the rules can be accessed or identified in a data set or data source of the organization that created the rule set.

Figure 4:
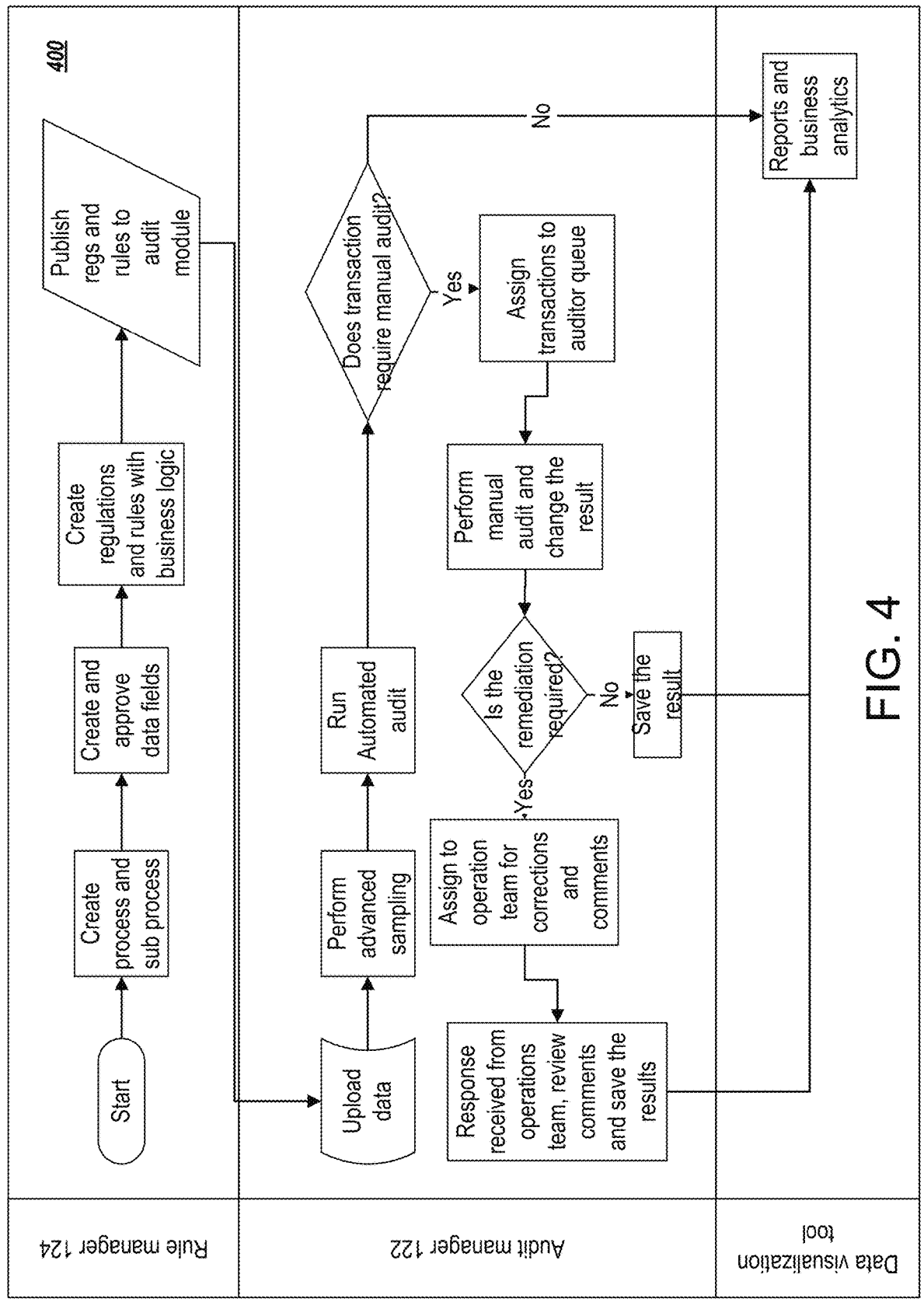
FIG. 4 illustrates a flow chart depicting a high level work flow of the system.

FIG. 4 shows the high-level workflow 400 of the system 100 wherein rules are created using the rule manger 124 after creating process, sub-process, data fields and regulations. Regulations and rules are published into audit manager 122 from the rule manager 124. Data can be imported or uploaded in the system 110 through pre-defined data fields. Data goes through an automatic validation process before loading into audit manager 122. Data then goes through sampling process wherein user can select data for audit with multiple sampling methods. Selected data then moves into automatic audit screen of the system 112 to run rules in the corresponding rule set 113 against records in the active data set 114.

The system 110 can return audit results as indicating compliance, non-compliance, subjective, and not applicable classifications for a record after an automated audit of a record (which may include may different documents or data components to the record). If the results do not require a manual audit, then data can be accessed through a data visualization tool to perform various analysis as needed. If the process requires a manual audit, then respective data will be added to a manual audit queue of an appropriate user (e.g., a supervisor or auditor) for manual review. Auditors will have ability to send the business data to operations team through follow up process for any clarifications or corrections. The record data will then be labeled or assigned to a compliance or noncompliance category manually by an auditor which will be moved into a data visualization tool for reporting.

The rule manager 124 is configured to perform configuration actions, including rule management and user management. The rule manager 124 performs functions such as:
dynamic regulation and rule creation with a user-friendly interface,
user-friendly rule validation with bulk upload options,
dynamic process/sub process creation,
dynamic data field creation, and
configuring data transformation of client data to the system's data format and data storage system.

The rule and user management functions can manage the inventory of regulations and rules, and in some cases the system enforces two, three, or more levels of rule approvals for improved accuracy.

The rules manager 124 can be a dynamic, user-friendly automation creator which allows for: rule-based programming, dynamic process and sub-process creation, agile data field creation and mapping, single rule creation or bulk upload options, inventory mapping to the organization's applicable regulations, risks, and controls; and multi-level review validations. The rule manager 124 uses form-based authentication and is available only for registered users of the system 110.

Figure 5:
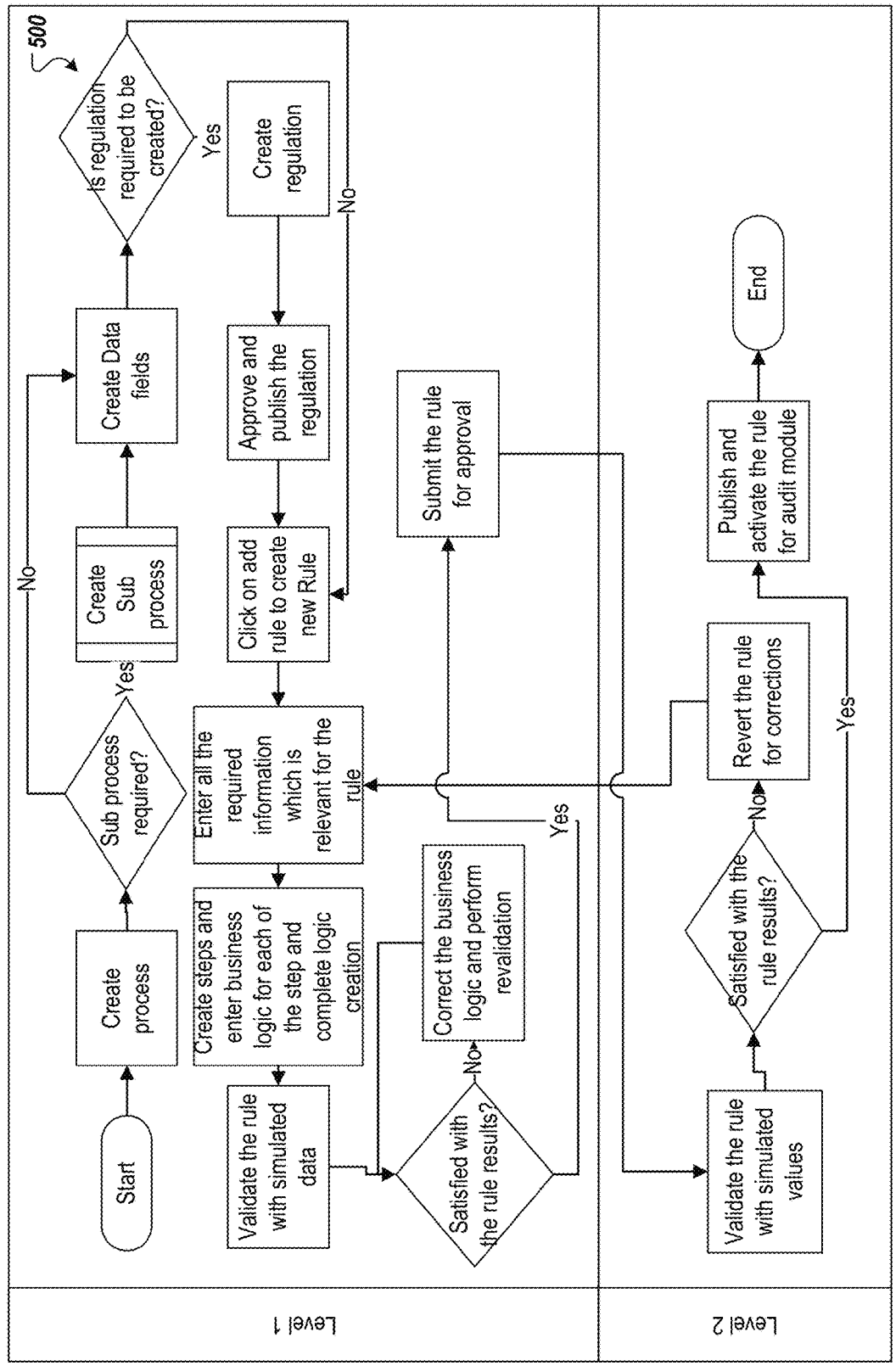
FIG. 5 illustrates a flow chart depicting the work flow of the rule manager module.

FIG. 5 illustrates a flow chart depicting the an example process 500 of rule creation in the rule manager 124 of the system. Before creating any rule, the system 110 can create process, sub-process (optional), data fields, and regulations (optional). If the regulation needs to be added, then the system 110 can create, approve, and publish the regulation. Once the relevant attributes are available, then the rule manager 124 can create rule with appropriate logic, and can show the results through a rule builder user interface. The rule manager 124 can also verify accuracy of the rule results by applying the rule to simulated data or sample data.

Once the level 1 user is satisfied with the rule results, then the said rule will be sent to Level 2 user to review and approve. Level 2 user can revert the rule back to Level 1 user if the said rule requires any changes. Once the Level 2 user is satisfied with the rule result, then rule can be activated to appear in the interface of the audit manager 122, and can be made available as part of the corresponding rule set 113.

The rule creation process in the rule manager 124 is described in detail with the help of FIGS. 6 to 10.

Figure 6:
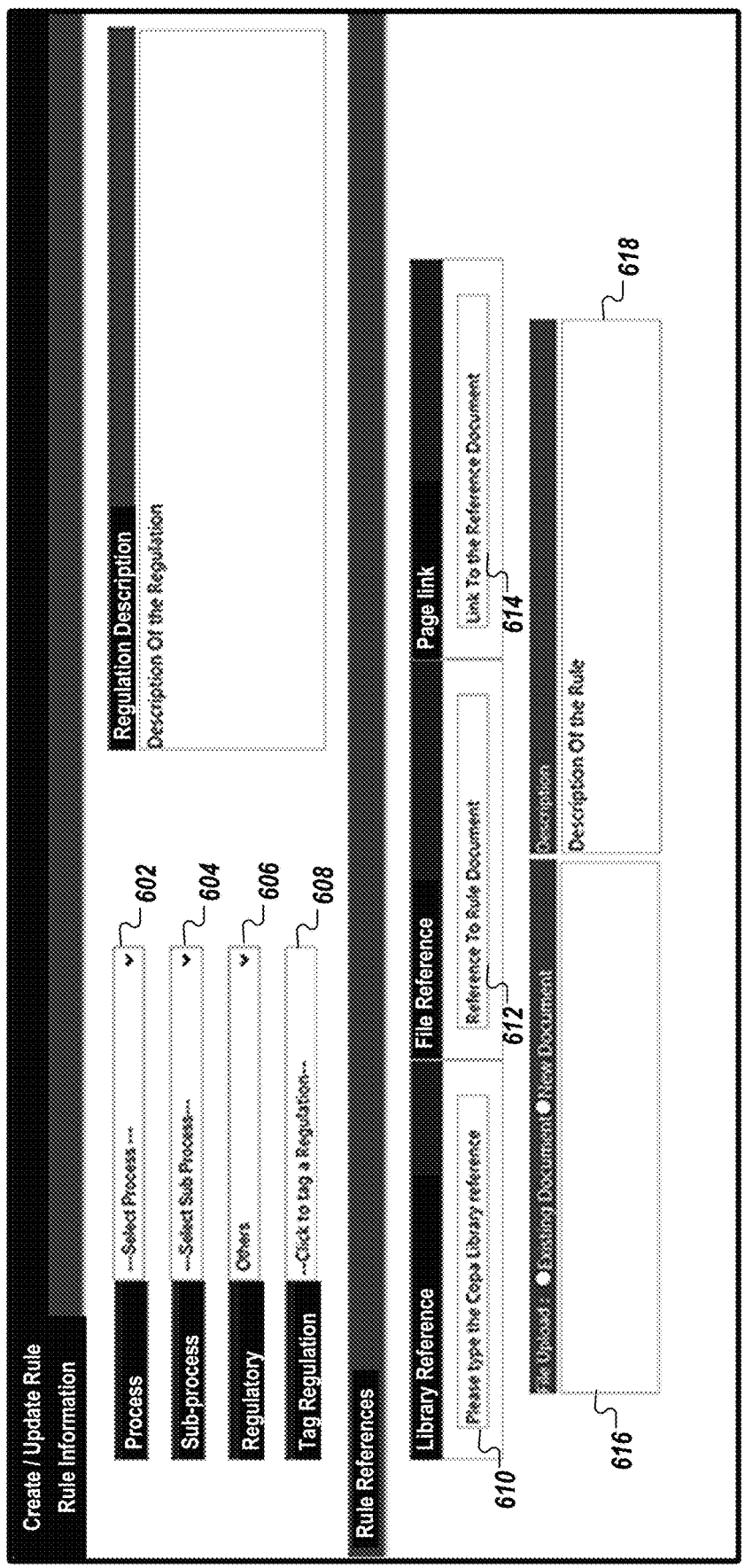

FIGS. 6 to 10 are examples of user interfaces (e.g., webpages that can be provided or supported by the system 110) for rule creation using the system 110. On the main webpage (not shown), the user selects the tab 'Actions' and then selects 'Add Rule'. The system then takes the user to screen 1 as illustrated in FIG. 6.

In FIG. 6, the user interface 600 for creating or updating a rule includes:
a Process control 602—This allows a user to specify the analysis process that the rule is created under, allowing multiple rules to be created and assigned within groups or hierarchies
a Sub-process control 604—This field allows a user to select a 'Sub-Process' name if any are associated with the above-selected main process.
a Regulatory control 606—If the process is associated with any kind of regulation, such as an investor requirement, accounting standard, or government regulation, then user can select an appropriate regulation type. Selecting a regulatory type is optional.
a Tag Regulation control 608—As user selected Regulatory type in the previous step, here the user can specify a relevant regulation (e.g., a section or requirement) to use to tag or label to the rule being created. Tagging Regulation is optional, and allows more efficient searching and verification that regulations are met.
Library Reference 610—This is an automated html URL link which will take user to above selected Regulation Guidelines section once user clicks on this link, this link will be seen across the application as a reference for a user.
File Reference 612—User will give the name of the document where he/she is referring for selected regulation guidelines. Giving a File Reference is an optional.
Page Link 614—Here, user will name the Page Number which he/she is referring the selected regulation from attached reference document. This is optional.
File Upload 616—Here, user will upload the referring Regulation document, user can select this document from existing list or can upload new one. This is optional.

Rule Description 618—Here, the user can type-in the description for the rule, question, or checklist item description.

Figure 7:
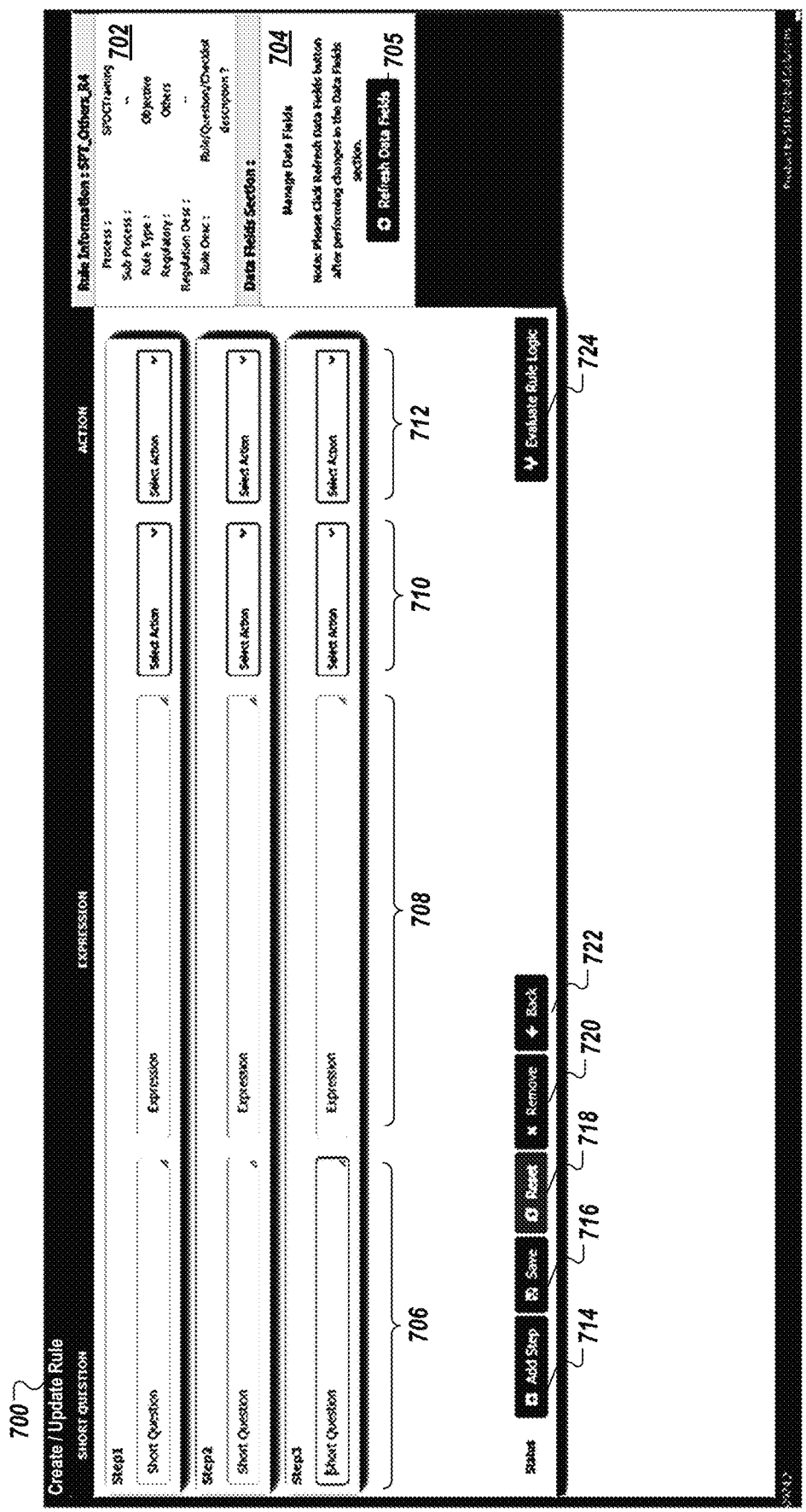

After appropriate fields are filled in the user interface 600 of FIG. 6, then the system 110 will take user to the user interface 700 illustrated in FIG. 7. The system 110 will generate a unique rule ID for each rule created. On the right-hand side, the rule information section 702 shows the information that the user selected in the previous interface 600. The data fields section 704 on the right side allows a user to create (e.g., define or import data elements) or update the data fields used or available to be used in a rule. The interface allows the user to navigate to a data field creation or editing page any time while writing a rule by selecting the control 705, and then return the rule creation interface 700.

The interface 700 can include controls that allows user to add on steps and create additional logical condition for a selected rule, for example, to save the current edits to the rule or add another level or step to the current rule. Other elements include:

Short Question(s) fields 706—Each Rule, Question, or Checklist will be divided into smaller steps. Each "short question" can represent a natural language statement of a condition to be checked. Examples include "Is the date in the correct range?" or "Are all data fields complete?" This provides a very brief, quickly-understandable statement of what the current step of the rule is intended to check. Logical expressions are written to represent or test each of the different short question(s), as different steps of the rules.

Step(s)—The set of steps being followed in order to test a rule. The steps of a rule can be added to define the process followed in applying a rule to a record.

Expression fields 708—A logical expression or operator for checking a condition for a step of a rule. These can be manually entered or designed by a user, based on the sets of data elements available, operators, and references that the system 110 has in its library and/or in the data for the specific user or organization using the system. Users can enter expressions such as "QUANTITY>10" or "QUANTITY>MIN_QUANTITY" where QUANTITY represents a data type or data element to be checked and MIN_QUANTITY represents another data element or a variable that may serve as a reference. The system 110 may determine the available data elements (e.g., database fields of the data sets or data sources used) as well as the set of available operators and provide them for selection or as auto-completion suggestions as the user types. The system can validate (e.g., verify) the logical expressions as they are entered or saved to ensure that the format is recognized by the system 110 can be performed by the system 110 and translated into executable code.

Action fields 710, 712—The user can select applicable to perform based on the outcome of the logical expression 708 of the step. Examples include a drop-down list of actions such as "go to step _____," a pass result assigned for the step, a fail result assigned for the step, a not Applicable label being assigned, a "subjective" or "suspect" label being assigned etc..

Add Step control 714—can be selected to add an additional step to the rule, with a new short question, expression, and action(s)

Save control 716—To save the work. On click of save, system will save the Rule created by user Reset control 718—To erase and reset all the data to start from fresh Remove control 720—To remove an unwanted step, which was added by clicking Add Step Back control 722—To go back to previous screen Evaluate Rule Logic control 724—Once the user has added required steps in a rule creation process and logical expression for each Short Question and saved it, then on click of the Evaluate Rule Logic control, user will move to the next step to validate the rule (see FIG. 8)

Figure 8A:
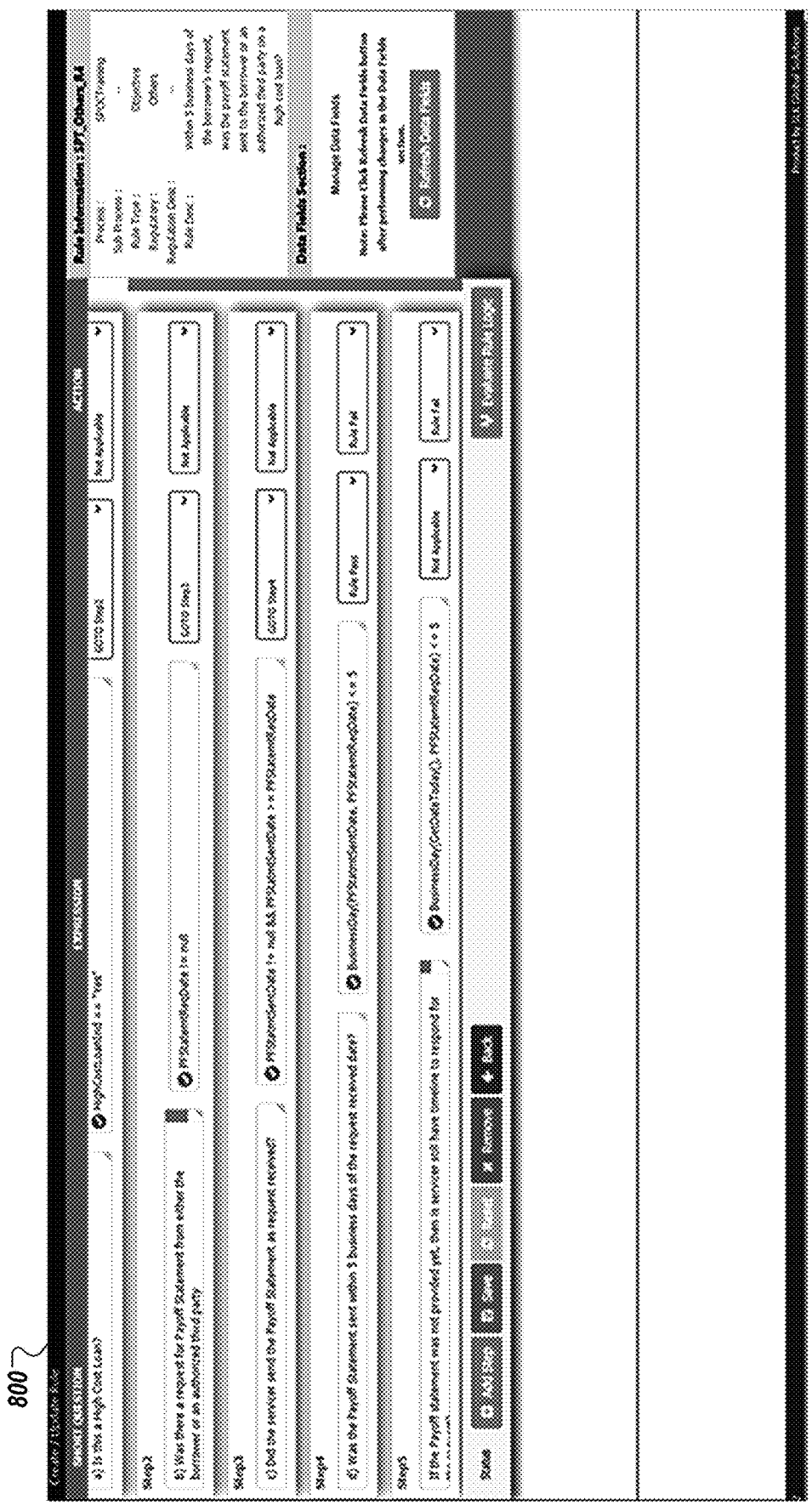

The screenshot as illustrated in FIG. 8A is an example of how to create Short Questions and add required steps in a rule creation process and logical expression for each Short Questions. FIG. 8A shows examples with the various fields of the user interface 800 (e.g., similar to interface 700) being populated. The first step indicates the question "a) Is this a High Cost Loan?," sets the expression "HighCostLoanInd=="Yes." The expression field has a checkmark icon indicating that the system has validated the expression and found it appropriate for execution. For example, the system 110 located the "HighCostLoanInd" data element in the data source or table of data types, recognizes the "==" operator, and that "Yes" is a valid reference for comparison. The has the first action "GOTO Step2" that is performed if the condition is true, and has a second action "not applicable" indicating that no second action needs to be performed if the expression evaluates to be true.

Figure 8B:
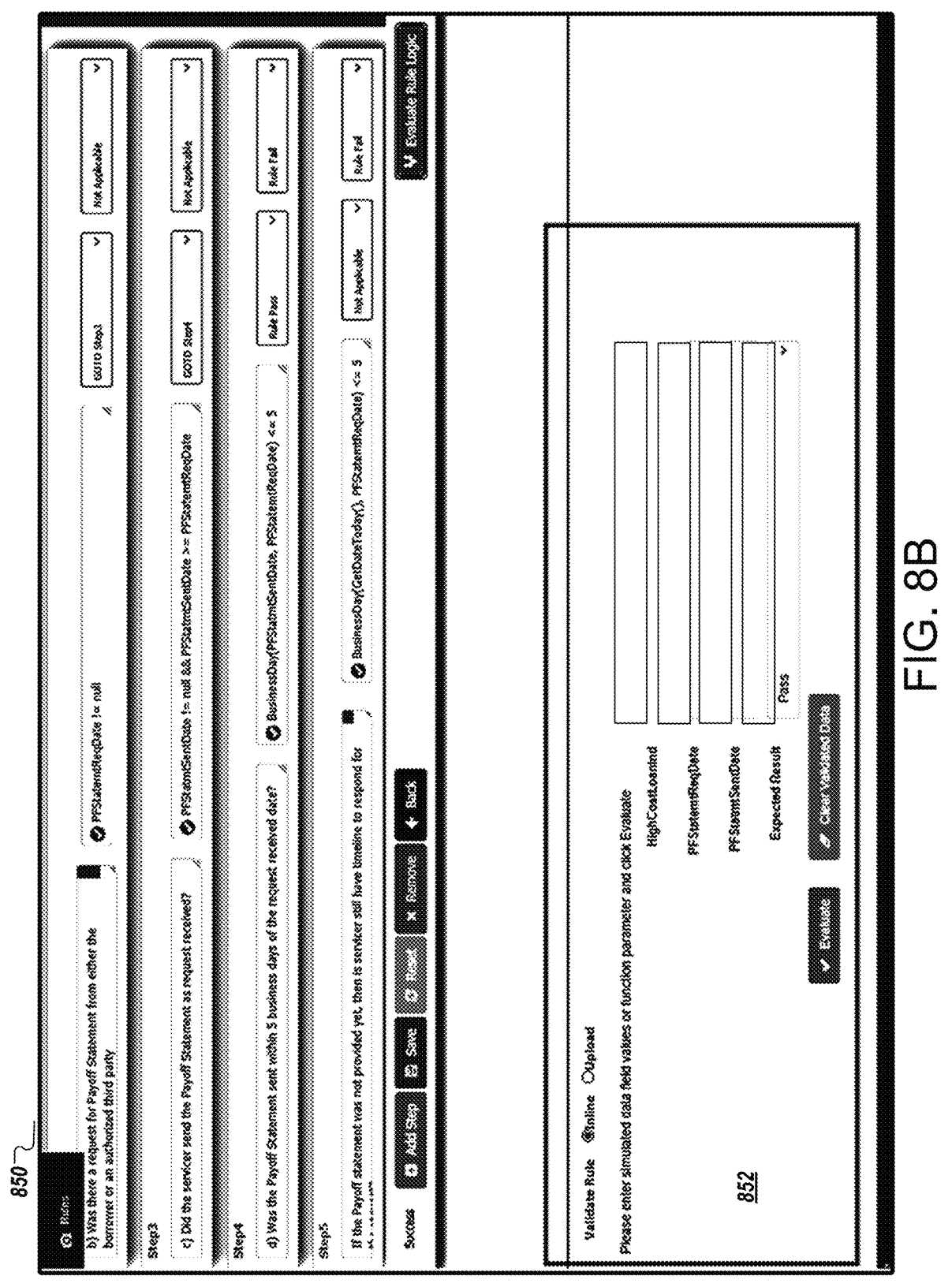

As seen in the interface 850 illustrated in FIG. 8B, on click of Evaluate Rule Logic, user will be provided a Rule validation area 852 which will allow to input different sets of example values and test the logical expressions and determine whether the rules are working as expected. This allows the user to see the effect of the rules on different example sets of data, in the same user interface 850 that is used for editing the rule. Any time if user feels something is missing or need to edit the rule, the user can edit the logical expressions, actions to be performed, and other rule elements without leaving the interface. In some implementations, the system 110 enables the user to access a record from an existing data set, or cycle through multiple records, to test the rule on sample data.

Figure 9:
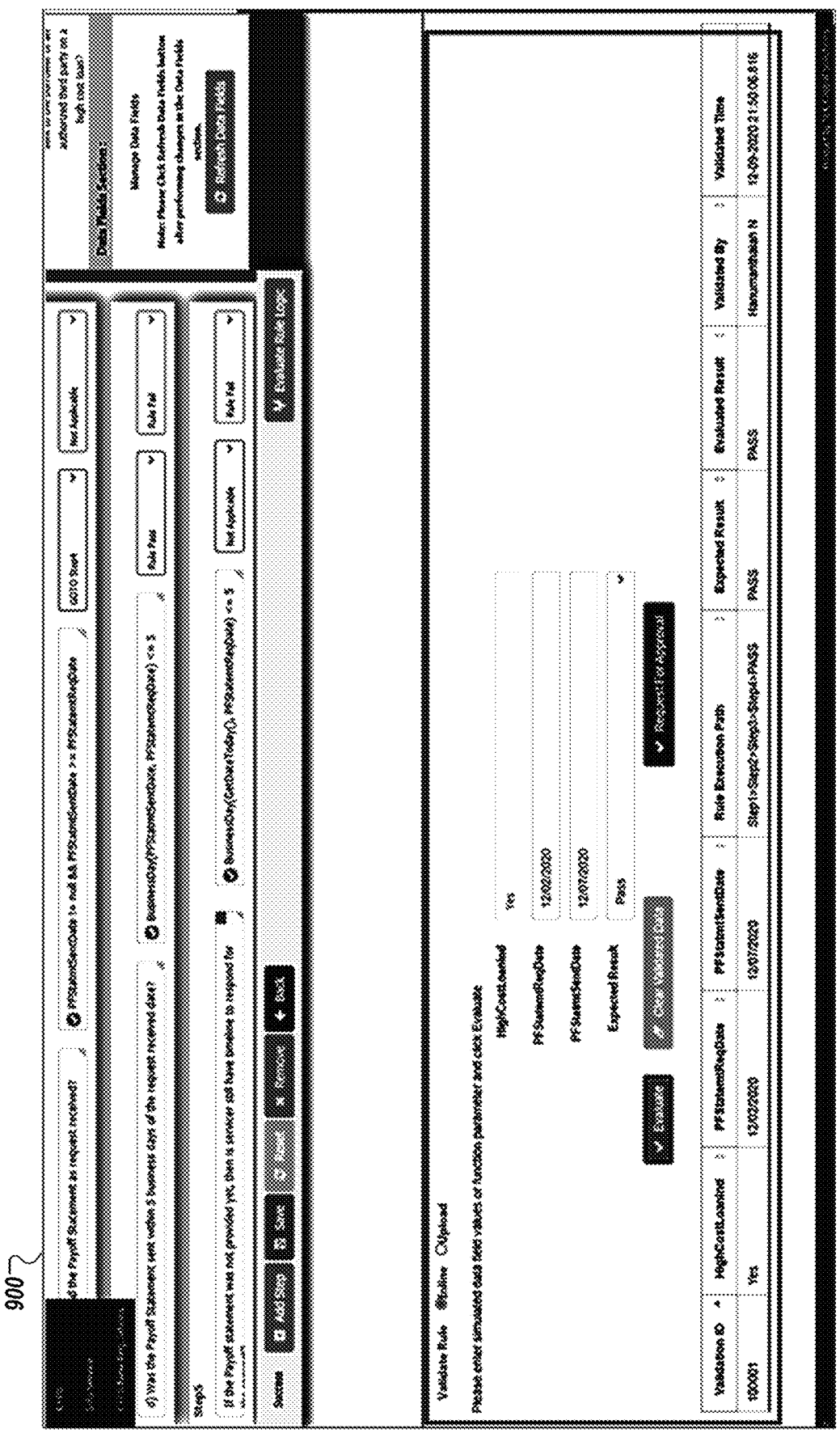

As seen in the user interface 900 illustrated in FIG. 9, the user will be allowed to type-in example data value set and validate the rule thoroughly, system will populate the screen with required data field header to type-in the data and validate the rule.

The Screen Contents description as seen in FIG. 9 are as follows:

Evaluate—Button which enables for use to click and check what would be the system results for the given values Clear Validated Data—Which will clear all logs of validation done by user Request for Approval—Once after user confirms that, this rule and logical expression is perfectly working as per the requirements, then user can click on Request for Approval button to forward this rule for his/her manager review.

Figure 10:
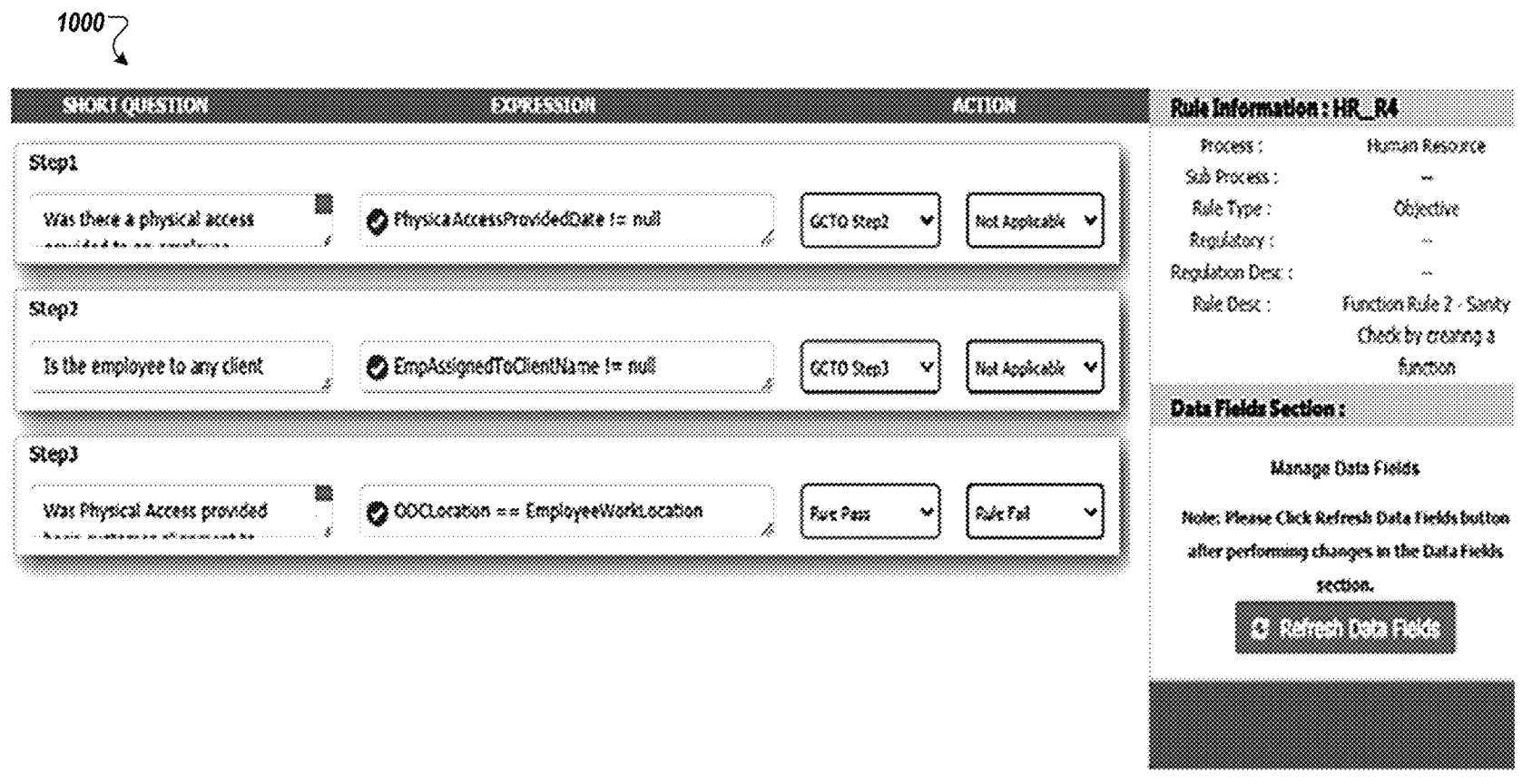

The user interface 1000 illustrated in FIG. 10 is a sample of a rule that is set by the user. Once the rules are saved, in the background on the application server the rules defined by the user are converted to actual code. The code is then compiled or otherwise converted into an executable or interpretable format. In some implementations, both the translation from a canonical form (e.g., logical expressions about data elements, in a series or hierarchy of rules and steps) into source code, and from source code into invokable code (e.g., bytecode, an executable, a dynamic-link library, etc.) are performed in response to a request from a user. In some implementations, neither the source code nor the invokable code may be stored or reused from one request to the next.

Following is an example of a code snippet that is generated based on the three steps shown in the user interface 1000, with the logical expressions being wrapped in various functions and other expressions to allow compilation and execution:

```
public Tuple<string,int>HR_R5 ( ) {
string Stepinfo=" ";
// start step process
  Step1:
  Stepinfo+="Step1>";
  if (PhysicalAccessProvidedDate !=null)
  {
     goto Step2;}
  else
  {
       return new Tuple<string,int>
(Stepinfo+"NA",9);;
  }
// start step process
  Step2:
  Stepinfo+="Step2>";
  if (EmployeeAssignToClientName !=null)
  {
     goto Step3;}
  else
  {
     return new Tuple<string,int>
(Stepinfo+"FAIL",0);;
  }
//start step process
  Step3:
  Stepinfo+="Step3>";
  if (ODCLocation==EmployeeWorkLocation)
  {
  return new Tuple<string,int>(Stepinfo+"PASS",1);;
  }
  else
  {
     return new Tuple<string,int>
(Stepinfo+"FAIL",0);;
  }
     }// close function HR_R7
```

As another example, to generate and use invokable code derived from a rule set, the system can create a data structure in a Process Data & Transaction table to save the data to be processed (Dynamic Field generation). The system creates or defines an analysis process, which will create a process identifier. For each process identifier, the system can create rules, save rules to database, and then import data to be assessed. The system then executes an assessment, by obtaining the analysis process identifier associated with the uploaded data, and then retrieving the rule set 113 associated with the process identifier.

For each rule in the rule set a function is created in a class:
String str="using System;
using System. Data;
using System.Data.SqlClient;
using System.Collections.Generic;
using System.Collections;
using System.Text;
using static CPS.AuditFunctions;
namespace CPS {
public class AuditRules: MarshalByRefObject
{
  public static Nullable<T>GetValueOrNull<T>(SqlDataReader rdr, string columnName) where T: struct
  {
. . .
. . .
. . .

Various algorithms can be used for writing the source code. For example, various instructions in generating the source code, to append data to a string representing the code to be compiled. As a few examples:
if variable Type is Float
{
Str=str+"Float"+FieldName1
}
What is the condition
Str=str+"If   (FieldName1"+Condition+"FieldName2)"//
Or value defined in the rule
Str=Str+"If (FieldNme1==FieldNme1)"
Str=Str+"{"
"}"

The structure of source code for a rule can be predefined, such as in a template, where each variable, condition, or other element will be defined. The template can be populated in memory (e.g., RAM) as a string. The string is passed to a complier to generate a private dynamic-link library (DLL). The DLL will be loaded to the memory (e.g., RAM) also associated with the same project, product, and platform workspace. Once the DLL is generated with the required functions (e.g., with each function corresponding to a rule), the related record data (e.g., row data from a database or spreadsheet) is passed to the various functions to get the results.

In some implementations, the rule processor has a code analysis library to execute rules and fetch outputs. It is basically an engine which will provide the result of a rule with respect to the available data as Compliant/Non-Compliant. In this module, the user defined rules will used the accessed/uploaded data. This data is in a predefined format (Data types & columns). Once the data is available, the written rule will be processed with respect to the available data. A single rule can be applicable to one or more rows of data or multiple rules can be applicable to one or more rows of data which is called as a data set. Also, each rule can contain as single condition or multiple. This module also has the ability to do computation with respect to different data types, for e.g., Date, Numeric values, Text. The processing in this module takes place in a parallel processing system to enhance the performance and lessen the time taken to process the multiple datasets. The parallel processing is asynchronous in nature so as to not affect the working of the actual application. The rules defined by the user are converted to actual code during runtime and used. This again is carried out to improve the performance of the module and achieve accurate results. The results of the verification/compliance check is recorded to maintain a history in the database for analysis.

The audit manager 124 provides an automatic and manual audit, data upload and sampling; and configuration functions. the automatic and manual audits include automatic audit of rules and also perform manual testing for any exceptions from automatic audit. This module is user friendly as it has a role-based interface for work assignment and predefined workflows to user specified processes. The data upload and Sampling includes (a) bulk upload of data with various data types such as CSV, Delimited, excel; (b) data transformation and validation as configured in Rule manager 124; and (c) advanced sampling methodologies such as target, statistical and random.

The audit manager 124 also has Administrator settings to configure look up tables, Data grid names and User management with process specific permissions.

the audit manager 124 is an adaptive, configurable automated workflow which allows for: multi-file bulk data upload capabilities across various file types; targeted, statistical, and random sampling methodologies; and user-friendly, role-based workflows aligned to client specific processes; and execution of automated, manual, and hybrid rules developed in the rule manager 124. This module uses form based authentication and is available only for registered users. it also constitutes a data upload process, for uploading the business data from a shared folder or ftp folder.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A system for efficiently processing rule-based computing workflows, the system comprising:
    a database for storing data processing rules; and
    a server system configured to provide resources for a rule management user interface having interactive controls to create and edit data processing rules, the server system being configured to provide data indicating the data processing rules for storage in the database;
    wherein the server system is configured to provide one or more services to carry out functions specified through an application programming interface (API), wherein the server system is configured to perform operations comprising:
        receiving a request, according to the API, to apply a particular set of data processing rules specified by the request to a particular set of records specified by the request;
        obtaining, from the database, the particular set of data processing rules specified by the request;
        in response to receiving the request to apply the particular set of data processing rules to the particular set of records, dynamically translating the particular set of data processing rules obtained from the database into optimized versions that express the data processing rules in the particular set of data processing rules in executable or interpretable code configured to apply the particular set of data processing rules, wherein translating the set of data processing rules comprises selecting code snippets from a repository using stored mapping data that maps rule elements to code snippets, combining the selected code snippets, and inserting values or variables based on the data processing rules in the particular set of data processing rules to be applied; and
        invoking the executable or interpretable code in the optimized versions to apply the particular set of data processing rules to the records in the particular set of records specified by the request, including using multiple parallel software processes or threads that each invoke the executable or interpretable code to separately and concurrently process different subsets of the particular set of records, wherein the amount of software processes or threads is determined based on characteristics of the particular set of records specified by the request.

2. The system of claim 1, wherein the server system is configured to delete or discard the optimized versions of the particular set of data processing rules after processing the records in the particular set of records such that the optimized versions are not used to respond to subsequent requests.

3. The system of claim 1, wherein the server system is configured to provide the user interface to remote devices of each of multiple organizations or accounts, and to store separate sets of data processing rules for the respective organizations or accounts in the database.

4. The system of claim 1, wherein the request is associated with a particular organization or account; and
    wherein the server system is configured to obtain the particular set of records from among records maintained in the database in association with the particular organization or account.

5. The system of claim 4, wherein the particular set of data processing rules is a particular subset of the data processing rules defined for the particular organization or account, and obtaining the set of data processing rules comprises:
    generating a database request specifying the particular subset; and
    executing the database request to retrieve the particular subset of the data processing rules.

6. The system of claim 1, wherein the server system is configured to:
    determine a count of records in the particular set of records;
    determine, based on the count of records, a particular number of software processes or threads to initiate to apply the particular set of data processing rules to the records;
    divide the particular set of records into a number of subsets equal to the particular number of software processes or threads; and
    initiate the particular number of software processes or threads, with each of the software processes or threads being assigned to process a different one of the subsets of the particular set of records, the software processes or threads running concurrently to independently invoke the executable or interpretable code for their respective subsets.

7. The system of claim 6, wherein determining the number of software processes or threads comprises:

determining a maximum number of records per software process or thread; and determining the number of software processes or threads such that each of the records can be assigned to a software process or thread and each software process or thread is assigned no more than the maximum number of records from the set of records.

8. The system of claim 1, wherein the data processing rules in the particular set of data processing rules indicate criteria for evaluating the records in the particular set of records;

wherein the one or more services include an audit manager service, wherein the audit manager service is configured to invoke the executable or interpretable code in the optimized versions to apply the particular set of data processing rules to the particular set of records; and wherein the audit manager service is configured to store results of invoking the executable or interpretable code in the optimized versions, the results indicating, for each of the records in the particular set of records, whether the record satisfies the respective criteria.

9. The system of claim 8, wherein the criteria specify at least one of a threshold for a value in a record, a range for a value in a record, a content element for a record, or a processing step required for a record.

10. The system of claim 1, wherein the server system is configured to provide the user interface as part of a web application hosted by the server system, the web application being configured to manage requests for application of rules to data sets through the user interface in a non-blocking manner to enable users to (i) request application of data processing rules to records using the user interface and (ii) navigate between different pages of the web application while the requested application of the data processing rules is performed in the background.

11. The system of claim 1, wherein the data processing rules in the particular set of data processing rules include rules that provide conditional branching to apply different criteria and rule elements depending on content and context of the records.

12. The system of claim 1, wherein the user interface includes interactive controls for a user to (i) define rule elements that each include a condition to be evaluated based on values of one or more data fields of a record, and (ii) relationships among the rule elements.

13. The system of claim 1, wherein the user interface is configured to provide, in the user interface, a preview area the indicates results of applying, to a sample record, rules as currently edited in the user interface.

14. The system of claim 13, wherein the user interface provides a control for a user to select the sample record from among one or more data sets associated with the user, or wherein the system automatically selects the sample record from among one or more data sets associated with the user.

15. The system of claim 1, wherein the server system provides a rule manager service and an audit manager service, wherein the rule manager service receives input through from the server system to create and update data processing rules in the database, and wherein the audit manager service is configured to apply the data processing rules to data sets and the audit manager service is restricted to read-only access to the data processing rules in the database.

16. The system of claim 1, wherein the optimized versions of the data processing rules in the particular set of rules include one or more in-memory dynamic link libraries (DLLs) that provide different functions corresponding to the data processing rules such that the data processing rules in the particular set of rules can be separately called by the server system.

17. The system of claim 1, wherein the server system generates and invokes the code in the optimized versions such that the server system generates and saves, for each record, result data indicating each condition of the set of rules that is determined, through invocation of the code, to not be satisfied; and wherein the server system is configured to access the result data for a record and provide resources for a user interface that identifies (i) a classification determined for the record based on the application of the data processing rules and (ii) and output specifying conditions of the rules that were determined to not be satisfied.

18. One or more non-transitory computer-readable media storing instructions that are operable, when executed by one or more computers of a server system, to cause the server system to perform operations comprising:

providing, by the server system, resources for a rule management user interface having interactive controls to create and edit data processing rules;

storing, by the server system, a set of data processing rules defined using the user interface in a database;

providing, by the server system, one or more services to carry out functions specified through an application programming interface (API);

receiving, by the server system and through the API, a request to apply a particular set of data processing rules specified by the request to a particular set of records specified by the request;

obtaining, by the server system, the particular set of data processing rules from the database;

in response to receiving the request to apply the particular set of data processing rules to the particular set of records, dynamically translating the particular set of data processing rules obtained from the database into optimized versions that express the data processing rules in the particular set of data processing rules in executable or interpretable code configured to apply the particular set of data processing rules, wherein translating the set of data processing rules comprises selecting code snippets from a repository using stored mapping data that maps rule elements to code snippets, combining the selected code snippets, and inserting values or variables based on the data processing rules in the particular set of data processing rules to be applied; and invoking the executable or interpretable code in the optimized versions to apply the particular set of data processing rules to the records in the particular set of records specified by the request, including using multiple parallel software processes or threads that each invoke the executable or interpretable code to separately and concurrently process different subsets of the particular set of records, wherein the amount of software processes or threads is determined based on characteristics of the particular set of records specified by the request.

19. A method for efficiently processing rule-based computing workflows, the method comprising:

providing, by a server system, resources for a rule management user interface having interactive controls to create and edit data processing rules;

storing, by the server system, a set of data processing rules defined using the user interface in a database;

providing, by the server system, one or more services to carry out functions specified through an application programming interface (API);

receiving, by the server system and through the API, a request to apply a particular set of data processing rules specified by the request to a particular set of records specified by the request;

obtaining, by the server system, the particular set of data processing rules from the database;

in response to receiving the request to apply the particular set of data processing rules to the particular set of records, dynamically translating the particular set of data processing rules obtained from the database into optimized versions that express the data processing rules in the particular set of data processing rules in executable or interpretable code configured to apply the particular set of data processing rules, wherein translating the set of data processing rules comprises selecting code snippets from a repository using stored mapping data that maps rule elements to code snippets, combining the selected code snippets, and inserting values or variables based on the data processing rules in the particular set of data processing rules to be applied; and invoking the executable or interpretable code in the optimized versions to apply the particular set of data processing rules to the records in the particular set of records specified by the request, including using multiple parallel software processes or threads that each invoke the executable or interpretable code to separately and concurrently process different subsets of the particular set of records, wherein the amount of software processes or threads is determined based on characteristics of the particular set of records specified by the request.

\* \* \* \* \*